US008321569B2

(12) United States Patent
Bello et al.

(10) Patent No.: US 8,321,569 B2
(45) Date of Patent: Nov. 27, 2012

(54) SERVER RESOURCE ALLOCATION

(75) Inventors: Adekunle Bello, Pflugerville, TX (US);
Douglas Griffith, Austin, TX (US);
Somasundaram Krishnasamy, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/640,268

(22) Filed: Dec. 17, 2009

(65) Prior Publication Data
US 2011/0153825 A1     Jun. 23, 2011

(51) Int. Cl.
*G06F 15/173* (2006.01)
(52) U.S. Cl. ........................................ 709/226; 709/217
(58) Field of Classification Search .................. 709/217, 709/226
See application file for complete search history.

(56) References Cited

U.S. PATENT DOCUMENTS

| 6,006,018 | A | * | 12/1999 | Burnett et al. | 709/219 |
| 6,940,835 | B2 | | 9/2005 | Borella | |
| 7,272,613 | B2 | * | 9/2007 | Sim et al. | 709/223 |
| 7,489,690 | B2 | | 2/2009 | Kakadia | |
| 7,809,675 | B2 | * | 10/2010 | Jain et al. | 709/213 |
| 2002/0112023 | A1 | * | 8/2002 | Karamanolis et al. | 709/217 |
| 2002/0161848 | A1 | * | 10/2002 | Willman et al. | 709/213 |
| 2003/0172160 | A9 | | 9/2003 | Widegren | |
| 2004/0044744 | A1 | * | 3/2004 | Grosner et al. | 709/217 |
| 2004/0260745 | A1 | * | 12/2004 | Gage et al. | 709/200 |
| 2008/0097858 | A1 | | 4/2008 | Vucina | |
| 2009/0240783 | A1 | * | 9/2009 | Susairaj et al. | 709/217 |

* cited by examiner

*Primary Examiner* — Thomas Dailey
(74) *Attorney, Agent, or Firm* — David A. Mims, Jr.; Robert V. Wilder

(57) ABSTRACT

A method, programmed medium and system are disclosed which provide for end-to-end QoS for a set of processes that comprise a workload over nfs. A set of processes that comprise a workload such as the processes of a WPAR, or an entire LPAR are given a class designation and assigned priority/limits. The data are then passed to the server which allocates resources based on the sum total of all the current classes and their priorities and/or limits. This requires re-engineering the nfs client code to be workload-aware and the nfs server code to accommodate the resource allocation and prioritization needs of the nfs clients.

9 Claims, 4 Drawing Sheets

SERVER RESOURCE ALLOCATION

CROSS REFERENCE TO RELATED APPLICATIONS

This application is related to co-pending Continuation application Ser. No. 13/459,193 which was filed on Apr. 29, 2012, assigned to the assignee of the present application and included herein by reference. Subject matter disclosed but not claimed herein is disclosed and claimed in the referenced Continuation Application.

FIELD OF THE INVENTION

The present invention relates generally to information processing systems and more particularly to a methodology and implementation for enabling an improved processing system for resource allocation in network file system (nfs) servers.

BACKGROUND OF THE INVENTION

The Network File System (nfs) is one of the most prevalent forms of remote file systems in a distributed environment today. Typically an nfs server provides file system services to thousands of clients, typically running different operating systems. In client-server transactions, both the client and the server have various workloads and processing priorities.

There is no easily administrated method to provide end-to-end priority between client and server independent workloads. Current solutions offer non-integrated Quality of Service (QoS) controls for each level of the client/server stack that is not able to distinguish one workload from another. As a result, one workload running at a significantly high priority could have its priority compromised when put in an nfs client-server environment.

Additionally, mobile workloads require various configuration changes to be made after the workload has been moved. So the result is input/output (I/O) priority on the client and server sides are workload-aware but do not provide end-to-end QoS. As a result the nfs server would not be able to respond dynamically to workload changes. This causes poor performance.

Thus, there is a need to provide a network server access processing system which is enabled to avoid the problems set forth above.

SUMMARY OF THE INVENTION

A method, programmed medium and system are provided for an end-to-end QoS and not just a network bandwidth QoS. The disclosed system ensures QoS down to the Disk I/O layer. The system implements basic I/O daemon (biod) queue ordering on each nfs client, and on the nfs server the I/O from the clients are prioritized based on the workload class and passed down through the local file system to the I/O layer. Alternatively, for the nfs server, the I/O load is based on percentages and percentages are assigned to each class. In one example, the workloads are grouped into classes. One advantage of this process is that it allows a guaranteed percentage of I/O shares for a particular workload irrespective of the number of workloads.

A set of processes that comprise a workload such as the processes of a workload partition (wpar) or an entire logical partition (lpar) are given a class designation and assigned priority/limits. The data are then passed to the server which allocates resources based on the sum total of all the current classes and their priorities/limits. This process requires re-engineering the nfs client code to be workload-aware and the nfs server code to accommodate the resource allocation and prioritization needs of the nfs clients.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable or wireless device, it is understood that disclosed methodology may also be applied in many other available and future devices and systems such as cell phones and personal wireless and other hand-held devices, including any input device, including touch-sensitive screens or touch-sensitive input pads, to achieve the beneficial functional features described herein.

The disclosed system provides for end-to-end QoS for a set of processes that comprise a workload over nfs. A set of processes that comprise a workload such as the processes of a WPAR, or an entire LPAR are given a class designation and assigned priority/limits. The data are then passed to the server which allocates resources based on the sum total of all the current classes and their priorities and/or limits. This requires re-engineering the nfs client code to be workload-aware and the nfs server code to accommodate the resource allocation and prioritization needs of the nfs clients.

Figure 1:
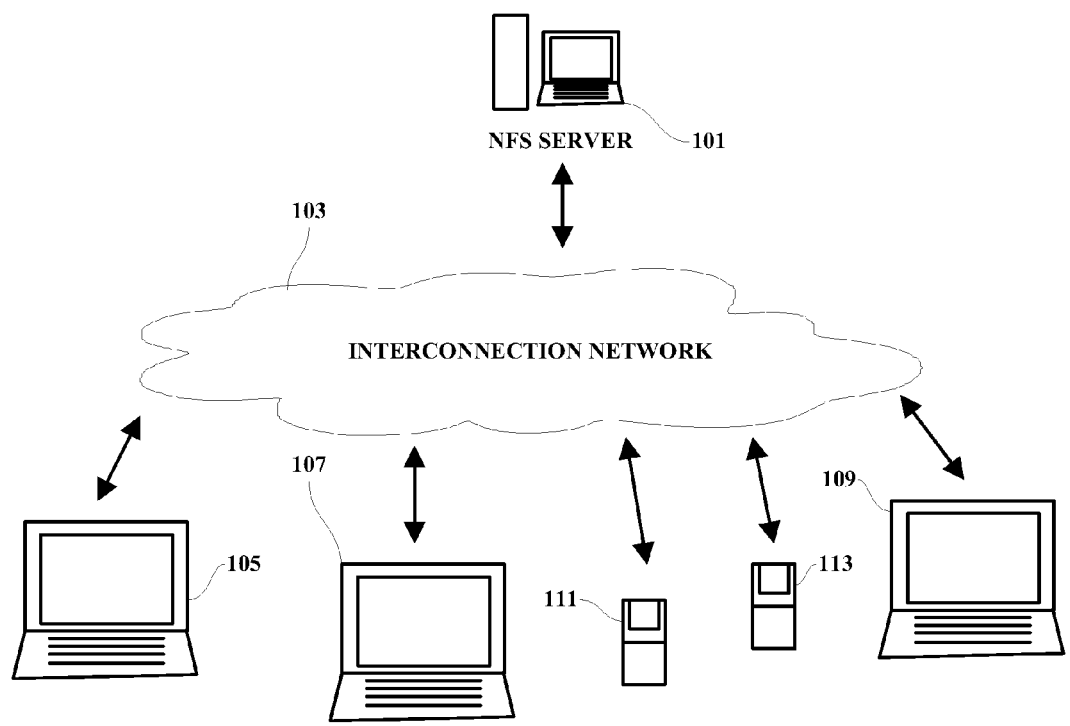
FIG. 1 is an illustration of one embodiment of a system in which the present invention may be implemented.

FIG. 1 illustrates an exemplary environment in which the present invention may be implemented. As shown, an nfs server 101 may be accessed through an interconnection network 103, such as the Internet, by a plurality of client devices including computer terminals 105, 107 and 109 and other wireless devices 111 and 113. The client devices 105, 107 and 109 may be laptop computers and the wireless client devices 111 and 113 may be personal wireless communication devices.

Figure 2:
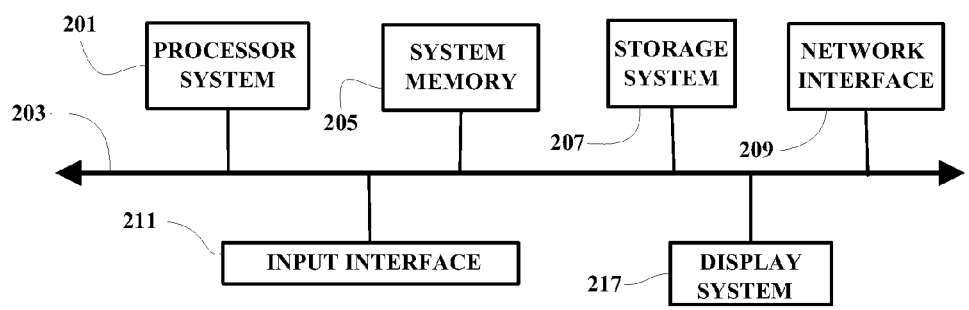
FIG. 2 is a block diagram showing several of the major components of an exemplary computer system or device using the present invention.

FIG. 2 illustrates several of the major components of a computer system which may be used to implement the present invention. As shown, a processor system 201 is connected to a main bus 203. The main bus 203 is also coupled to, inter alia, system memory 205, a local storage system 207, a network interface 209, and an input interface 211. The main bus is also connected to a display system 217. The input and/or display system may also comprise a touch-sensitive screen or optically-sensitive input pad (not shown). Additional devices and bus systems, which are not shown, may also be coupled to the system main bus 203.

Figure 3:
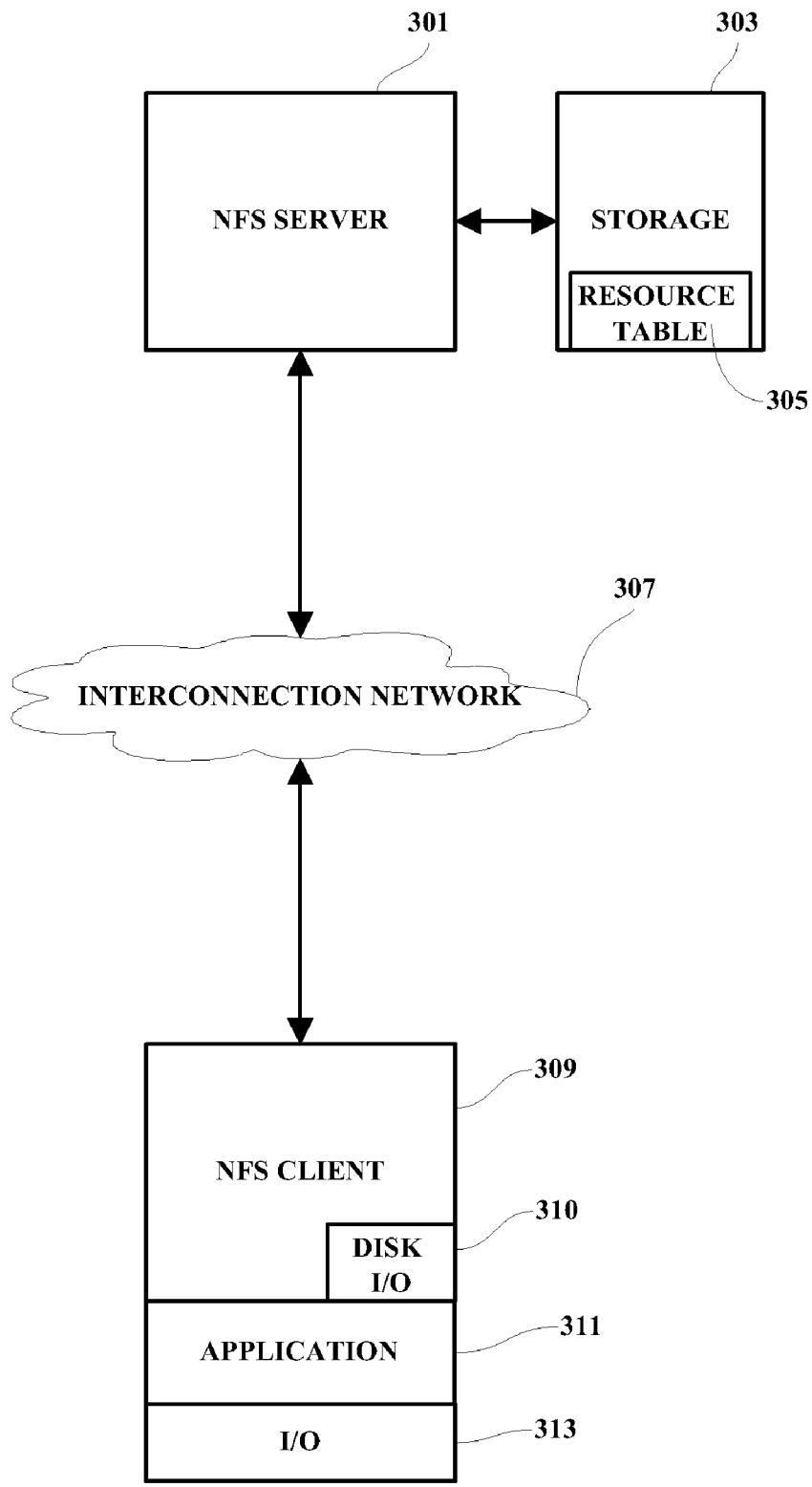
FIG. 3 is a block diagram illustrating nfs client-server system configuration.

In FIG. 3, there is shown an nfs server 301 which is coupled through an interconnection network 307 to an nfs client 309. The nfs client 309 is shown including, inter alia, a disk I/O system 310. The nfs client device 309 is also running an application function 311 and includes a user I/O interface 313. The nfs server 301 is coupled to a storage system 303 which includes, inter alia, a Resource Table 305. The Resource Table includes an allocation of server resources based upon the sum total of all of the current classes and their priorities and limits. The term "Resource Table" refers to the data structure that the nfs server will use to keep information about its resources about the workloads. It could be implemented using link-list, tables, maps or more esoteric data structures.

Figure 4:
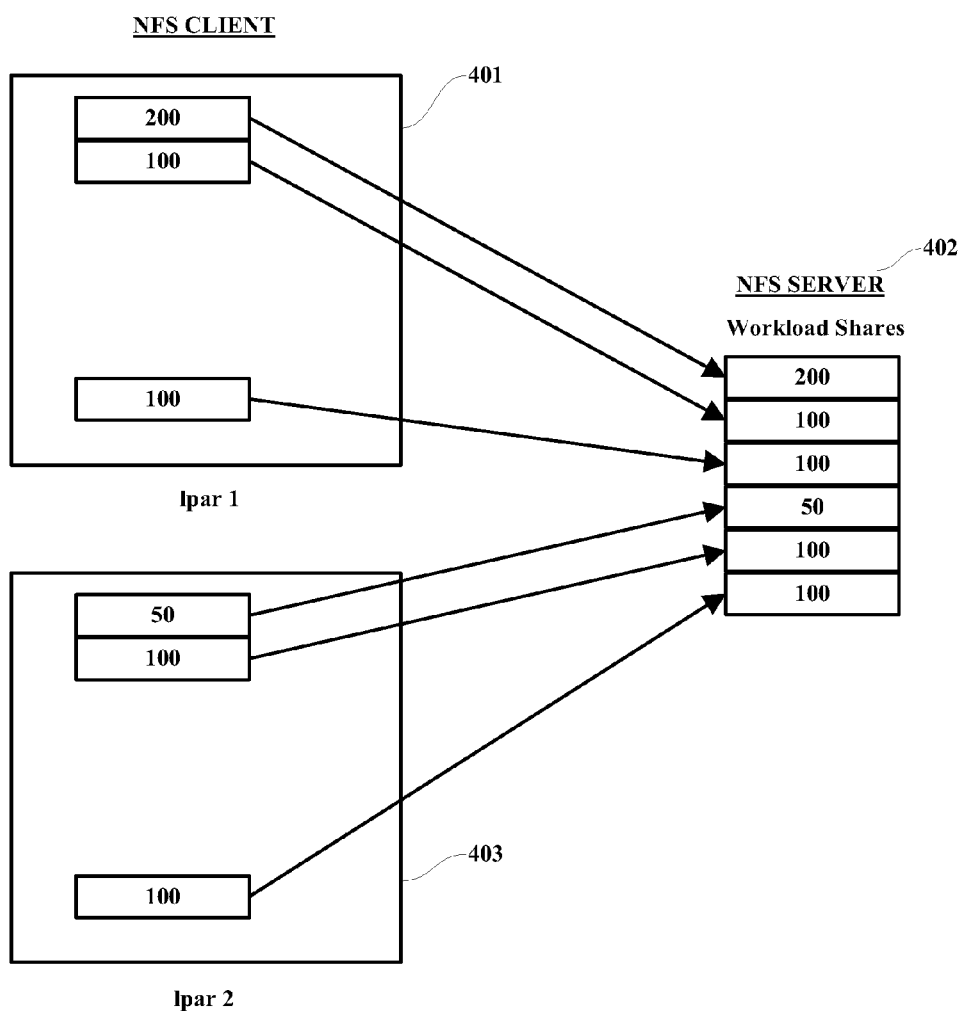
FIG. 4 is an illustration useful in explaining weighting and prioritization functions of an nfs server in an exemplary embodiment of the present invention.

In FIG. 4, there is shown an nfs client with lpar 1 401 and lpar 2 403. Each lpar includes a series of jobs, each with a relative weight, e.g. "200", "100" and "50", as represented by the individual blocks within the lpars. Lpar 1 and lpar 2 refer to sample nfs clients. The "weights" represent the relative priority of the workloads, such that, for example, "200" is higher than "50". It is noted that the order in the resource table is not important, it is just a data structure that stores the weights. It is the weights themselves that determine the wpars' priorities.

Figure 5:
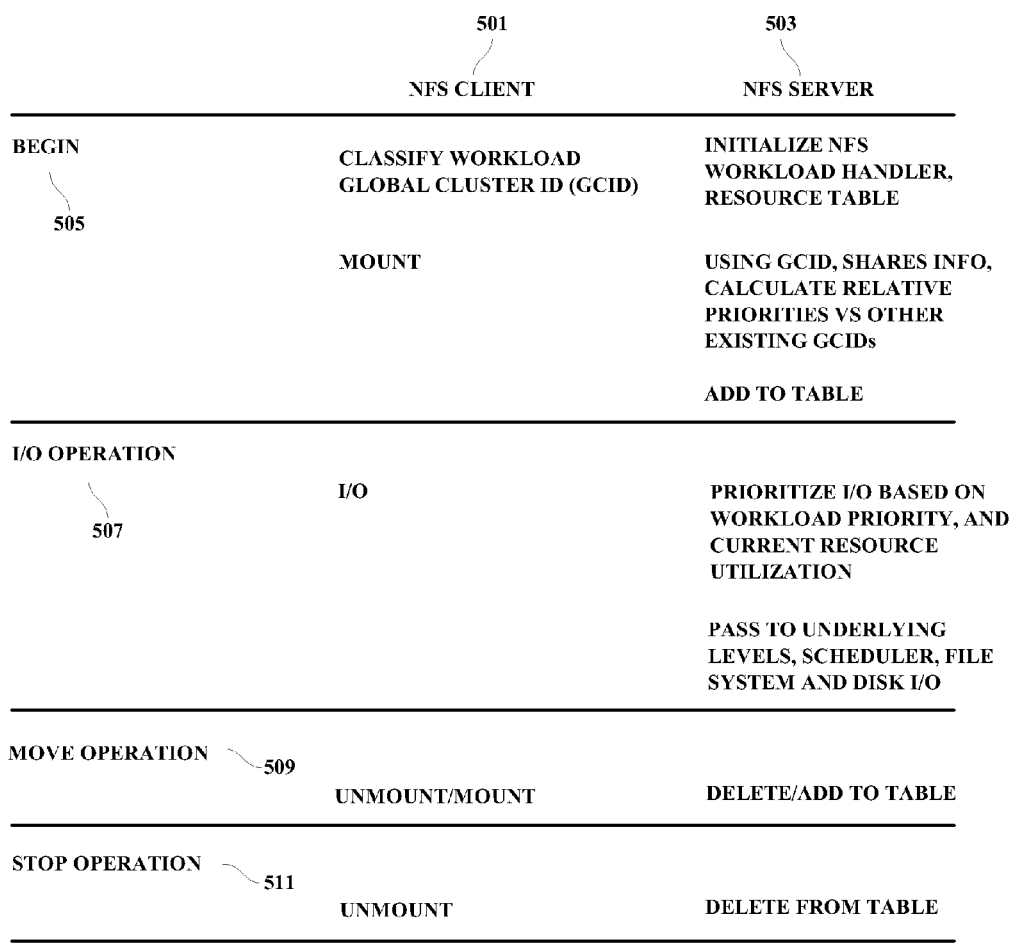
FIG. 5 is an illustration useful in explaining an exemplary sequence of operations which may be implemented in accordance with the present invention.

In FIG. 5, there is shown an exemplary flowchart or sequence of events in an operation of the present invention. The leftmost column represents an overall operational function, the center column shows the operation of the nfs Client 501 and the rightmost column shows the corresponding operations occurring at the nfs Server 503. A set of processes that comprise a workload such as the processes of a wpar, or an entire lpar are given a class designation and assigned priority/limits. These data are then passed to the server which then allocates resources based on the sum total of all the current classes and their priorities/limits. This requires re-engineering the nfs client code to be workload-aware and the nfs server code to accommodate the resource allocation and prioritization needs of the nfs clients. At the start 505 of the exemplary operation, the nfs Client 501 classifies the global cluster ID (GCID) workload and the nfs workload handler and the Resource Table are initialized at the server 503. Next, A Mount function occurs at the nfs Client and the server, using GCID and SHARES information, calculates the relative priority (PRI) of the nfs client 501 vs. other existing GCIDs of other clients. This requires re-engineering of the nfs client code to be workload-aware and the nfs server code to accommodate the resource allocation and prioritization needs of the nfs client. This prioritization is then added to the Resource Table.

Next, in an I/O operation, I/O information is sent from the nfs client 501 and is prioritized at the server based on workload priority and current resource utilization, and this prioritized listing is then passed down to underlying levels, i.e. task scheduler, file system and disk I/O.

In a Move operation 509, the nfs client mounts/unmounts the server which, in turn, deletes or adds to the Resource Table. When the operation is stopped 511, the nfs client unmounts and the workload information associated with the nfs client 501 is deleted from the Resource Table.

Thus, there has been provided an end-to-end QoS from the client application (nfs Client) to the storage server (nfs Server) using nfs protocol as a conduit.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer program product comprising a computer-readable, tangible storage device(s) and computer-readable program instructions stored on the computer-readable, tangible storage device(s) for enabling processing of transactions between an nfs server and nfs clients, the computer-readable program instructions, when executed by a processor system, being operable for implementing a method comprising:

> receiving a workload request from an nfs client, said workload request having been assigned a class designation by said nfs client;
>
> initiating an nfs workload handler and a resource table at said nfs server in response to receiving said workload request from said nfs client;
>
> calculating a relative priority of said workload request from said nfs client among other existing workloads of other nfs clients to provide a prioritized listing of workload requests; and
>
> allocating nfs resources by said nfs server based on a sum total of all current classes of workload requests at said nfs server, wherein said nfs server processing is modified to accommodate said nfs allocation of resources and said nfs client is made aware of said allocating of nfs resources at said nfs server, wherein said nfs server is further operable for adding said nfs allocation of resources to a resource table at said nfs server, and wherein said nfs server is further operable for passing said prioritized listing of said nfs client workload requests down to underlying levels at said nfs server.

2. The computer program product as set forth in claim 1 wherein said nfs server is further operable for passing said prioritized listing of said nfs client workload requests down to a task scheduler, file system and disk input-output (I/O) system at said nfs server.

3. The computer program product as set forth in claim 2 wherein said allocating is accomplished on a continuing basis upon receiving additional workload requests from one or more nfs clients.

4. The computer program product as set forth in claim 3 wherein said nfs server is further operable for deleting information associated with said nfs client from said resource table upon completion of said workload request from said nfs client.

5. The computer program product as set forth in claim 1 wherein said nfs server is further operable for assigning priorities to said workload requests from said nfs client.

6. The computer program product as set forth in claim 5 wherein said nfs server is further operable for assigning limits to said workload requests from said nfs client.

7. The computer program product as set forth in claim 6 wherein said nfs resources are allocated by said nfs server based on all current classes, priorities and limits of workload requests received at said nfs server.

8. A network file system (nfs) server configured for processing transactions with nfs clients, said nfs server comprising:

> receiving means for receiving a workload request from an nfs client, said workload request having been assigned a class designation by said nfs client;
>
> a processing system for initiating an nfs workload handler and a resource table at said nfs server in response to receiving said workload request from said nfs client;
>
> said processing system being further operable for calculating a relative priority of said workload request from said nfs client among other existing workloads of other nfs clients to provide a prioritized listing of workload requests; and
>
> said processing system being further operable for allocating nfs resources by said nfs server based on a sum total of all current classes of workload requests at said nfs server, wherein said nfs server processing is modified to accommodate said nfs allocation of resources and said nfs client is made aware of said allocating of nfs resources at said nfs server, wherein said nfs server is further operable for adding said nfs allocation of resources to a resource table at said nfs server, and wherein said nfs server is further operable for passing said prioritized listing of said nfs client workload requests down to underlying levels at said nfs server.

9. A network file system (nfs) including an nfs server and a plurality of nfs clients connected in a network, said nfs server being configured for processing transactions with said nfs clients, said nfs system comprising:

> a plurality of nfs clients;
>
> an nfs server coupled to said nfs clients;
>
> a client processing system at said nfs client for assigning a class designation, a priority designation and appropriate limits to a workload request of said nfs server;
>
> a client interface for sending said workload request to said nfs server;
>
> an nfs server receiving device for receiving a workload request from an nfs client, said workload request having been assigned a class designation, a priority designation and appropriate limits by said nfs client;
>
> said nfs server device being operable for initiating an nfs workload handler and a resource table at said nfs server in response to receiving said workload request from said nfs client;
>
> an nfs server processing system for calculating a relative priority of said workload request from said nfs client among other existing workloads of other nfs clients to provide a prioritized listing of workload requests;
>
> said nfs processing system being operable for allocating nfs resources by said nfs server based on a sum total of all current classes, priorities and limits of workload requests at said nfs server, said nfs processing system being further operable for modifying processing at said nfs server to accommodate said nfs allocation of resources and means for making said nfs client aware of said allocating of nfs resources at said nfs server;
>
> said nfs processing system being further operable for adding said nfs allocation of resources to a resource table at said nfs server; and
>
> said nfs processing system being further operable for passing said prioritized listing of said nfs client workload requests down to underlying levels at said nfs server, said underlying levels including a task scheduler, file system and disk input-output (I/O) system at said nfs server, wherein said allocating is accomplished on a continuing basis upon receiving additional workload requests from one or more nfs clients, said nfs system further including deleting information associated with said nfs client from said resource table upon completion of said workload request from said nfs client.

* * * * *